C. C. AYER.
Wheel.
No. 70,681.  Patented Nov. 12, 1867.
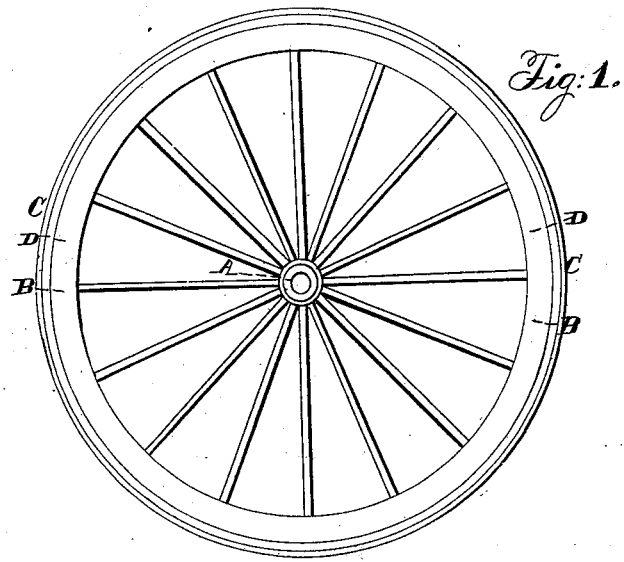
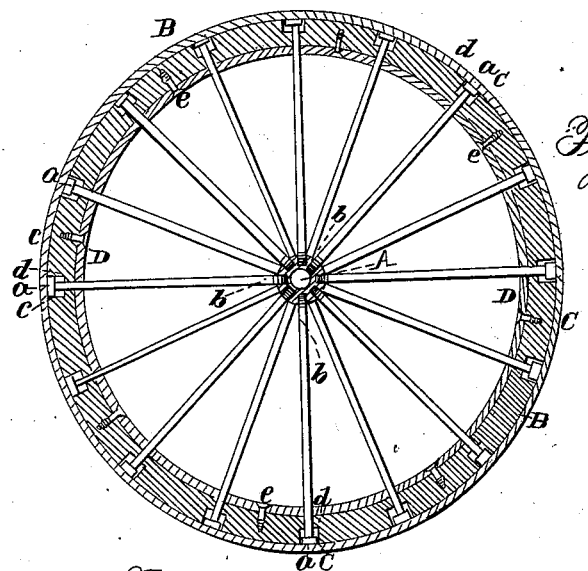
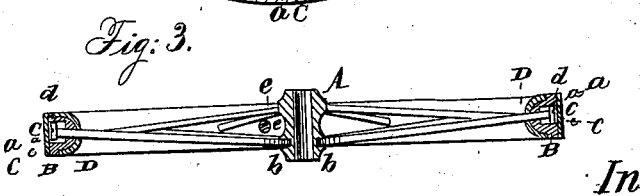
Witnesses.
F. P. Hale Jr.
Geo. H. Andrews
Inventor
Chas. C. Ayer.
by his Attorney
R. H. Eddy

United States Patent Office.

CHARLES C. AYER, OF CHELSEA, ASSIGNOR TO HIMSELF AND HENRY A. BREED, OF LYNN, MASSACHUSETTS.

Letters Patent No. 70,681, dated November 12, 1867.

IMPROVEMENT IN CARRIAGE-WHEEL.

The Schedule referred to in these Letters Patent and making part of the same.

TO ALL PERSONS TO WHOM THESE PRESENTS SHALL COME:

Be it known that I, CHARLES C. AYER, of Chelsea, in the county of Suffolk, and State of Massachusetts, have invented a new and useful Improvement in Carriage-Wheels; and I do hereby declare the same to be fully described in the following specification, and represented in the accompanying drawings, of which—

Figure 1 is a side elevation,
Figure 2 a longitudinal section, and
Figure 3 a transverse section of a carriage-wheel made in accordance with my invention.

In the said wheel, the hub is suspended from the upper semicircle of the rim or felloe by the spokes, whereby the weight of the carriage body and its load are supported by a tension strain on the spokes, each spoke at its head resting on an elastic cushion or spring.

In carrying out my invention, I combine and arrange with the hub, the wooden felloe, and the metallic spokes, an inner or auxiliary annular and arched tire, whose office is to support the felloe, and prevent it from being split or broken under and by the draught of the spokes upon it.

In the drawings, A denotes the hub, B the felloe, C the main or wheel-tire, and D the auxiliary arched tire. The inner tire is a metallic annulus, bent transversely in a semicircle or curved form, or thereabouts, in manner as shown in fig. 3, so as to embrace or nearly embrace and fit to the wooden felloe B. Each spoke is formed with a head, $a$, at its outer end. A screw, $b$, formed on its inner end, goes through the wooden felloe and the auxiliary tire D, and screws into the hub. The head of the spoke is arranged within a chamber, $c$, made in the felloe. An elastic annulus or cushion, $d$, of vulcanized India rubber or its equivalent, is placed within the chamber, and on its bottom. The shank of the spoke goes through the cushion, and the head $a$ rests against it. The arched ring or auxiliary tire D may be fastened to the felloe by means of screws $e$ going through the said tire, and being screwed into the felloe. This tire not only performs the function above mentioned, but supports the felloe against the strain or pressure tending to crowd upward that part of it which may be next the ground when the wheel may be in use.

This wheel is designed to be used for locomotive steam engines, or railway carriages of other descriptions, as well as for common road vehicles and wagons. Each of the spokes being arranged obliquely with respect to the plane of its junction with the felloe, contributes greatly to the strength of the wheel, and enables it to resist lateral strains.

What I claim as my invention, is—

The combination as well as the arrangement of the metallic annulus or inner tire D with the wooden felloe and the spokes and hub, as explained.

I also claim the combination as well as the arrangement of the metallic annulus or inner tire D with the wooden felloe, the hub, spokes, and outer tire, as described.

I also claim the combination as well as the arrangement of the metallic annulus D, the wooden felloe, the springs and chambers therein, the spokes, and the hub, as described, the hub, under such a combination of the spokes with it and the felloe, being suspended from the upper half of the felloe and on springs, while the wheel may be in revolution and use.

CHARLES C. AYER.

Witnesses:
R. H. EDDY,
F. P. HALE, Jr.